United States Patent [19]
Hardy

[11] Patent Number: 6,025,870
[45] Date of Patent: Feb. 15, 2000

[54] AUTOMATIC SWITCHING OF VIDEOCONFERENCE FOCUS

[75] Inventor: Ron Hardy, Cedar Park, Tex.

[73] Assignee: Vtel Corporation, Austin, Tex.

[21] Appl. No.: 09/172,485

[22] Filed: Oct. 14, 1998

[51] Int. Cl.⁷ ........................................ H04N 7/14
[52] U.S. Cl. ............................ 348/15; 348/16; 379/93.21
[58] Field of Search ................................ 348/14, 15, 16; 370/260; 379/202, 93.21; H04N 7/14

[56] References Cited

U.S. PATENT DOCUMENTS

| | | | |
|---|---|---|---|
| 4,516,156 | 5/1985 | Fabris et al. | 348/15 |
| 5,477,546 | 12/1995 | Shibata et al. | 348/15 |
| 5,821,984 | 10/1998 | Ito et al. | 348/15 |

FOREIGN PATENT DOCUMENTS 407095554A  4/1995  Japan ............................ H04N 7/15

*Primary Examiner*—Curtis A. Kuntz
*Assistant Examiner*—Melur Ramakrishnaiah
*Attorney, Agent, or Firm*—Skjerven, Morrill, MacPherson, Franklin & Friel, LLP; Stephen A. Terrile

[57] ABSTRACT

A videoconference system includes a video switch for selecting focus video information, a physical video input node coupled to provide physical video information to the video switch, a graphics processing module coupled to provide graphical video information to the video switch, and a remote source interface coupled to provide remote video information to the video switch. The videoconference system further includes an audio processing module for processing audio information. A record controller is coupled to the video switch, the graphics processing module and the audio processing module. The record controller is coupled to receive event information from the audio processing module and the graphics processing module. The record controller automatically determines a focus video source from among the physical video input, the graphics processing module and the remote source interface responsive to receiving the event information. The record controller controls the video switch to couple the focus video source to a video switch output responsive to determining the focus video source.

26 Claims, 8 Drawing Sheets

AUTOMATIC SWITCHING OF VIDEOCONFERENCE FOCUS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to recording and/or viewing a videoconference, and, more particularly, to switching an input to a videoconference recording and/or viewing device between multiple available sources in a videoconference system.

2. Description of the Related Art

A videoconference environment typically includes a plurality of conference sites, commonly referred to as endpoints, which are geographically separated but electronically linked together to enhance collaboration between and among individuals at the various conference sites. A videoconference system attempts to replicate the interpersonal communication and information sharing which would occur if all the participants were together in the same room at the same time.

A videoconference typically includes two or more endpoints coupled together via digital communication lines. For example, in a point-to-point conference, two endpoints are coupled in a videoconference. One endpoint dials the other endpoint directly to initiate the videoconference. More than two endpoints may be coupled in a multipoint videoconference. In a multipoint videoconference, each endpoint dials a multipoint control unit (MCU) which couples the endpoints in a common videoconference.

Each endpoint typically transmits and receives conference information (e.g., audio and video information) to and from the other endpoint(s). Each conference site includes at least one source of conference information. For example, each endpoint has one or more audio and video sources from which to select for transmission to the other endpoint(s). Typically, only one audio signal and one video signal are transmitted from each endpoint. Audio sources at the endpoint are usually mixed together to form a single audio signal for transmission, but video sources are individually chosen to be the transmitted video signal. Exemplary sources include microphones, cameras and/or computer systems. Exemplary video sources include physical video sources such as cameras for viewing conference participants and/or documents (e.g., paper documents) and graphical video sources such as computer systems for generating and annotating slides (e.g., computer graphics).

As noted, videoconferencing involves the transfer of conference information from endpoint to endpoint. Conference information includes video and/or audio information. Video information includes physical information captured by a camera and graphical information generated by an information processing system such as a computer system. Physical information refers to recorded information providing a representation of "real world" information such as an image of a conference participant and/or an image of a slide or paper document. Physical information is captured and recorded, for example, by a physical information source such as a camera. Graphical information refers, for example, to graphical data information which is generated and displayed by an information processing system on a computer system display monitor or an overhead projector. A graphical information source is any data information generation, annotation and/or display such as a computer system. Graphical information may be provided on the same display or on a different display as physical information from a camera. Audio information is typically transmitted with corresponding video information.

Ideally, endpoints transmit conference information from a conference focus source to each of the other connected conference sites. As used herein, the conference focus source is the source providing the conference information which would have the attention of participants in the conference were the participants located together in the same room at the same time. The focus of a conference may include, and may switch between, a primary speaker, a participant asking a question, a data screen provided by a slide projector or computer system, or some other source of conference information. Thus, the conference focus frequently shifts from one source of conference information to another during the course of a typical videoconference. Determining the focus of a videoconference is a well-known challenge in the design of videoconference systems, and often requires manual intervention on the part of conference participants.

Videoconference systems often include a videocassette recorder (VCR). Integration of a VCR provides the ability to record a videoconference. Ideally, a video recording of a videoconference switches to whichever source is the current focus of the conference (i.e., the conference focus source). Switching the source provided to the VCR to record the focus of the conference typically requires user interaction such as pressing a button to select the source for recording.

SUMMARY

It has been discovered that a videoconference may be more efficiently and accurately recorded and/or viewed through the use of a system and method for dynamically and automatically detecting which conference information source of a videoconference is the focus of the videoconference and automatically switching an input to a recording/viewing device so that the recording/viewing device receives the focus source of the conference. Such a system and method provide the advantage that required user interaction for switching the video source of a videoconference recording/viewing device is minimized so that hands-free and unconscious control of video switching is provided. Videoconference participants can focus on the substance of the videoconference instead of simultaneously participating in the videoconference and controlling which portions of the videoconference are recorded by the videoconference recording device. Videoconference participants at each conference site may automatically record the focus of the videoconference while participating in the videoconference.

In one embodiment, a videoconference system includes a video switch for selecting focus video information, a physical video input node coupled to provide physical video information to the video switch, a graphics processing module coupled to provide graphical video information to the video switch, and a remote source interface coupled to provide remote video information to the video switch. The videoconference system further includes an audio processing module for processing audio information and a record controller. The record controller is coupled to the video switch, the graphics processing module and the audio processing module. The record controller is coupled to receive event information from the audio processing module and the graphics processing module. The record controller automatically determines a focus video source from among the physical video input, the graphics processing module and the remote source interface responsive to receiving the event information. The record controller controls the video switch to couple the focus video source to a video switch output responsive to determining the focus video source.

In another embodiment, a method of selecting the focus of a videoconference includes: receiving video information by a video switch from each one of a plurality of video sources, the plurality of video sources including a remote video source and a plurality of local video sources, the video switch providing video information from a current video source of the plurality of video sources to a video input node; receiving event information by a record controller, the event information indicating that an event video source of the plurality of video sources is transmitting video information pertinent to the videoconference; automatically determining by the record controller which of the remote and local video sources is the current video source; automatically determining by the record controller which of the remote and local sources is a focus video source based on the event information; automatically determining by the record controller if the video switch requires switching to provide video information from the focus video source depending on whether the focus video source is the current video source; and automatically controlling the video switch to switch to provide video information from the focus video source to the video input if the video switch requires switching.

In another embodiment, a system is provided for recording a focus of a videoconference between a plurality of conference sites. The conference sites include a local conference site having a local source and a remote conference site having a remote source. The system includes a recording device at the local conference site and a record controller coupled to the recording device. The recording device includes an input for receiving a stream of conference information. The record controller automatically selects a focus source from among a remote source and a local source. The remote source provides a remote stream of conference information, and the local source provides a local stream of conference information. The focus source provides a corresponding stream of conference information to the input of the recording device.

In another embodiment, an apparatus for selecting the focus of a videoconference for a video input includes a computer-readable storage medium and a record control module stored on the computer-readable storage medium. The record control module controls a video switch to select a focus video source from among a physical video input, a graphics processing module and a remote source interface responsive to receiving videoconference event information from an audio processing module and the graphics processing module.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Figure 1:
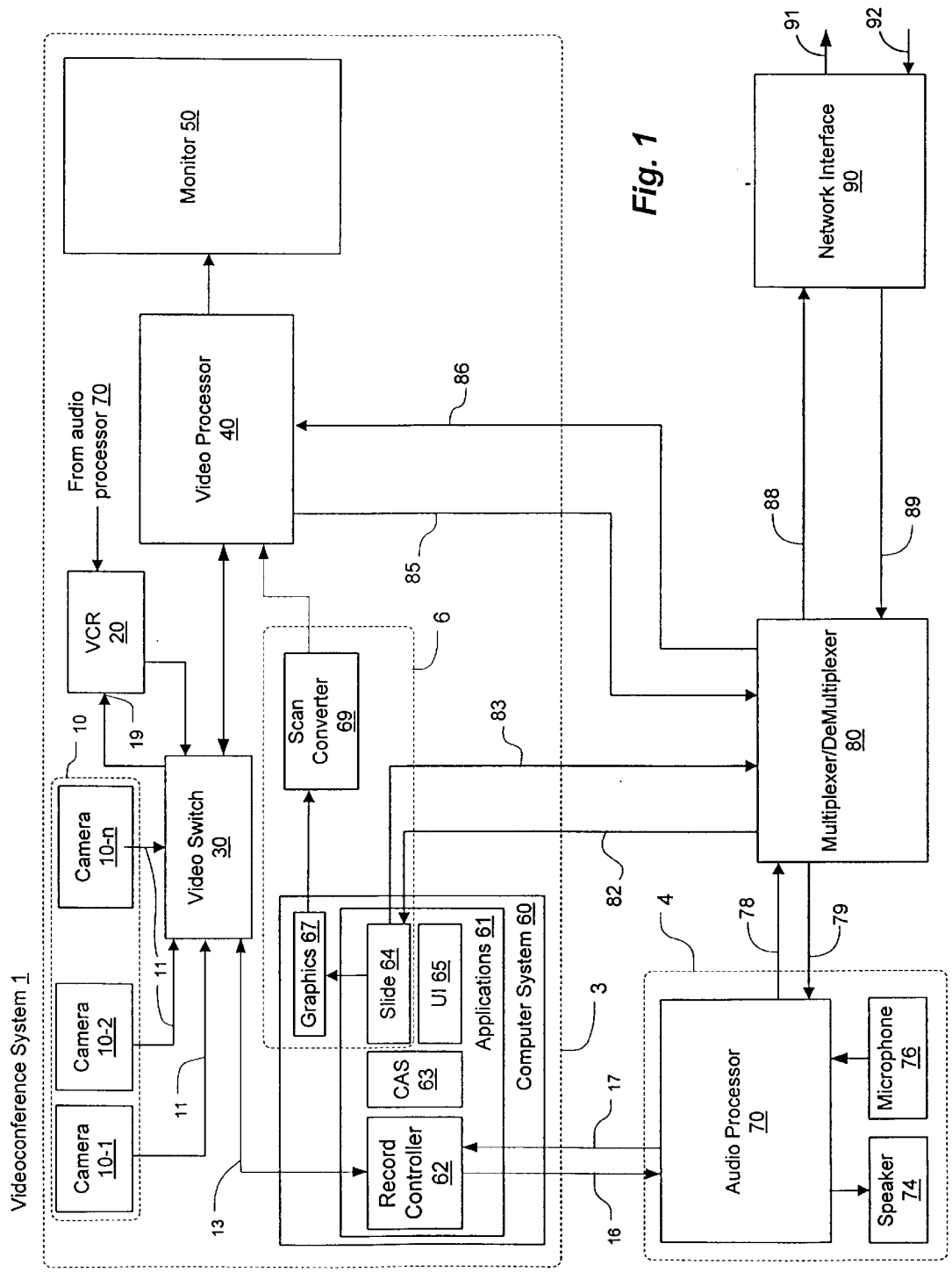
FIG. 1 shows a block diagram of one embodiment of a videoconference system in accordance with the invention.

The following description is intended to provide a detailed description of an example of the invention and should not be taken to be limiting of the invention itself. Rather, any number of variations may fall within the scope of the invention which is defined in the claims following the description.

In addition to the above described transfer conference information from endpoint to endpoint, conference system equipment and software provide event notifications. A notification is generated as a result of a conference event such as an action by a conference participant such as speaking or annotating a slide. A notification may include graphical event information (e.g., a slide annotation notification such as a flag, a source identifier and/or an action identifier indicating that a slide is being transmitted) or physical event information such as talk/listen event information (e.g., a conference participant talking notification such as a talk/listen flag for a particular source indicating that a conference participant at a corresponding site is talking). The event information provided by a notification allows various components of the videoconference system to determine when and where switching between sources should occur.

A record controller at a conference site (e.g., the local site) uses event information to control an input to a recording device to automatically record the focus of the conference. The record controller uses the event information to automatically determine a conference focus source from among the conference sources. The record controller then couples the conference focus source to an input of a recording device at the local site to provide the conference information stream from the focus source to the recording device to automatically record the focus of the videoconference. The local recording device has a single input which is switched to receive different sources under control of the record controller. In a multipoint videoconference, a multipoint control unit switches between the various remote sources to effectively provide a perceived singular remote source to the local site. An exemplary multipoint conference system is described in U.S. patent application, Ser. No. 09/057,849, filed on Apr. 9, 1998, entitled "Primary Transmission Site Switching in a Multipoint Videoconference Environment Based on Human Voice", naming Joon Maeng, Paul V. Tischler and Bill Clements as inventors, and which is incorporated herein by reference. The record controller selects from among singular remote source, whether perceived or actual, and any local sources such as cameras and computer systems.

The following exemplary principles are used to automatically select the focus source: when a remote conference participant talks, the recording device records the stream of conference information being transmitted from the corresponding remote site; when a conference participant at the local site talks, the recording device will record the stream of conference information being transmitted from the local site; and when a slide is sent, received, or annotated, the recording device will record the slide information. In one embodiment, when a local conference participant is talking, the local site is sending and local participants view the immediately previous remote talking site. The local recording device records the local conference participant instead of the previous remote talking site which is viewed at the local site. The above exemplary principles and the more specific principles presented below may also be used to supply a video-3 output to allow a company to hook up an external-to-conference monitor for monitoring company conferences.

Referring to FIG. 1, a local conference site videoconference system 1 includes video block 3, audio block 4, multiplexer/demultiplexer (mux/demux) 80 and network interface 90. Video block 3 includes computer system 60, scan converter 69, local physical sources 10 (e.g., cameras 10-1, 10-2 through 10-n; also referred to as cameras 10), recording equipment such as VCR 20, video switch 30, video processor 40 and monitor 50. Computer system 60 of video block 3 includes application memory 61. Application memory 61 includes record controller 62, conferencing automation server (CAS) 63, user interface (UI) 65, and a graphical information source such as a slide creation and annotation application (e.g., slide application 64).

Network interface 90, as shown in FIG. 1, is the physical hardware connection to the network line (e.g., ISDN or Ethernet) being utilized to connect the endpoints and transport the data streams. Mux/demux 80 packages the outgoing and incoming data streams. Mux/demux 80 can be a firmware component located on separate hardware (e.g., as in one embodiment for ISDN calls) or can be a software component on the computer system (e.g., as in another embodiment for Ethernet calls). Network interface 90 receives remote video and audio information from at least one remote conference site via coupling 92 and transmits the received remote video and audio information to mux/demux 80 via coupling 89. Network interface 90 receives local video and audio information via coupling 88 and transmits the local video and audio information to the remote conference site via coupling 91. Mux/demux 80 splits the remote audio information from the remote video information. Mux/demux 80 transmits the remote audio information to audio block 4 via coupling 79 and transmits the remote video information to video block 3 via couplings 82, 86. Mux/demux 80 receives local audio information from audio block 4 via coupling 78 and receives local video information from video block 3 via couplings 83, 85. Mux/demux 80 transmits the local audio and video information to network interface 90 for subsequent transmission to remote sites.

Audio block 4 includes audio processor 70 and various I/O devices such as speaker 74 and microphone 76. Audio processor 70 receives the remote audio information from mux/demux 80 via coupling 79 and receives local audio information from microphone 76. Audio processor 70 transmits the remote audio information to speaker 74. Audio processor 70 transmits the local audio information to mux/demux 80 via coupling 78. Audio processor 70 mixes the local and remote audio information, and transmits the mixed audio information to VCR 20. An exemplary audio processor 70 is the TMS320C31 Digital Signal Processor manufactured by Texas Instruments.

Video block 3 generates and processes local video information for display on monitor 50 and for transmission to other, remote conference sites. Video block 3 also receives and processes remote video information for display on monitor 50 and for possible recording by VCR 20. Video block 3 displays and/or records video information depending on the video switching operations discussed hereinafter.

Video block 3 processes both locally generated and remotely received graphical video information. For example, video block 3 generates and processes local graphical video information through the operation of graphics block 6. Graphics block 6 includes slide application 64, graphics module 67 and scan converter 69. Slide application 64 generates and/or edits graphical slides. Graphics module 67 is a graphics software and/or hardware module which prepares graphical slides for display on a computer screen. Scan converter 69 performs any necessary scan conversion for display of the graphical slides on monitor 50. For example, scan converter 69 converts video graphics array (VGA) video information received from graphics module 67 for display on a National Television System Committee (NTSC) standard or Phase-Alternation Line (PAL) standard monitor 50. Slide application 64 also provides the local graphical video information to mux/demux 80 via coupling 83 for subsequent transmission to remote sites. In addition to generating and processing local graphical video information, video block 3 receives remote graphical video information from mux/demux 80 via coupling 82. Thus, remote graphical slides may be edited by slide application 64 and/or passed on through graphics block 6 for display on monitor 50.

Video switch 30 receives local physical video information from cameras 10, remote physical video information from video processor 40 and graphical video information from slide application 64. Slide application 64 generates local graphical video information and receives and processes remote graphical video information. Video switch 30 further receives video select control information from record controller 62 of computer system 60. Video switch 30 provides focus video information selected from among the local and remote video information to VCR 20. Video switch 30 selects from among the local and remote video information under control of the video select control information received from record controller 62. The video select control information provided by record controller 62 depends various notifications as described hereinafter. For example, such notifications include talk/listen notifications received from audio processor 70, the graphical information provided by slide application 64, and other notifications from user interface 65 such as select camera and/or go to camera preset notifications to allow manual selection of the focus video information. VCR 20 records switched video information received from video switch 30 and mixed audio received from audio processor 70. Video switch 30 further provides selected local video information to video processor 40 for subsequent display on monitor 50 and/or subsequent transmission to remote sites via mux/demux 80 and network interface 90.

Video switch 30 selects the conference focus. For example, video switch 30 switches the conference information which is provided to input 19 by alternately coupling input 19 of VCR 20 to one of remote source network interface 90, local source cameras 10-1, 10-2 . . . 10-n and local source slide application 64. Video switch 30 is coupled to receive remote physical conference information from remote source network interface 90 via mux/demux 80. Video switch 30 is coupled to receive local physical conference information from cameras 10 via couplings 11. When selecting a local physical source, video switch 30 selects the local physical source (e.g., the one of cameras 10) that is currently being transmitted to a remote site. Video switch 30 is coupled to receive graphical conference information from slide application 64 via video processor 40. Video switch 30 is controlled by record controller 62 via coupling 13. Video switch 30 is also coupled to provide conference information to remote endpoints via video processor 40, mux/demux 80 and network interface 90.

Referring to FIG. 1, record controller 62, CAS 63, user interface 65 and slide application 64 are software modules stored in the application memory 61 of computer system 60. All event notifications except talk/listen messages come from software modules (e.g., record controller 62 or slide application 64) running in memory on computer system 60. Talk/listen notifications are generated by audio echo canceler firmware of audio processor 70. Record controller 62 processes the event information received from audio processor 70 and slide application 64 to determine the focus source of the conference from one of the sources shown in FIG. 1: network interface 90, cameras 10 and slide application 64. Record controller 62 controls the recording of the focus of the conference by selecting which of the conference information streams (e.g., the remote stream from network interface 90 and the local streams from slide application 64 and cameras 10) is provided to recording device input 19. The source providing the video information (e.g., the physical or graphical information) which is the visual focus of the conference is selected as the focus source of the conference. Record controller 62 controls video switch 30 to provide the video information from the focus source and accompanying audio information to recording device input 19.

Record controller 62 controls the selection of the conference focus so that conference participants at the conference site of videoconference system 1 can record the videoconference. For example, if a remote speaker at a remote conference site is speaking, the remote video and audio received at video block 3 from network interface 90 via coupling 88, mux/demux 80 and coupling 86 is selected by record controller 62 as the focus source. Video switch 30 then couples the remote conference information to input 19 of VCR 20. Also, if a local speaker at the conference site of video conference system 1 is speaking, the video provided by the one of cameras 10 which is currently being transmitted from videoconference system 1 is selected by video switch 30 as the focus source for coupling to input 19. VCR 20 records the local speaker even if the local conference site is viewing another, remote conference site (e.g., a formerly speaking remote conference site) while the local speaker speaks.

For further example, if a local speaker is speaking while showing a slide or annotating a slide on a computer screen, the focus source includes graphical information from slide application 64 and the mixed audio information. A user programmable, minimum switch-delay time may be implemented so that the graphical information remains the focus video information for a switch-delay time after the last annotation. After the switch-delay time passes or elapses, the focus video can return to a physical source of a currently speaking conference participant. For example, after the switch-delay time passes, the focus source is not necessarily switched immediately. Rather, voice activated switching is re-enabled so that it will switch when the next person speaks.

Figure 2:
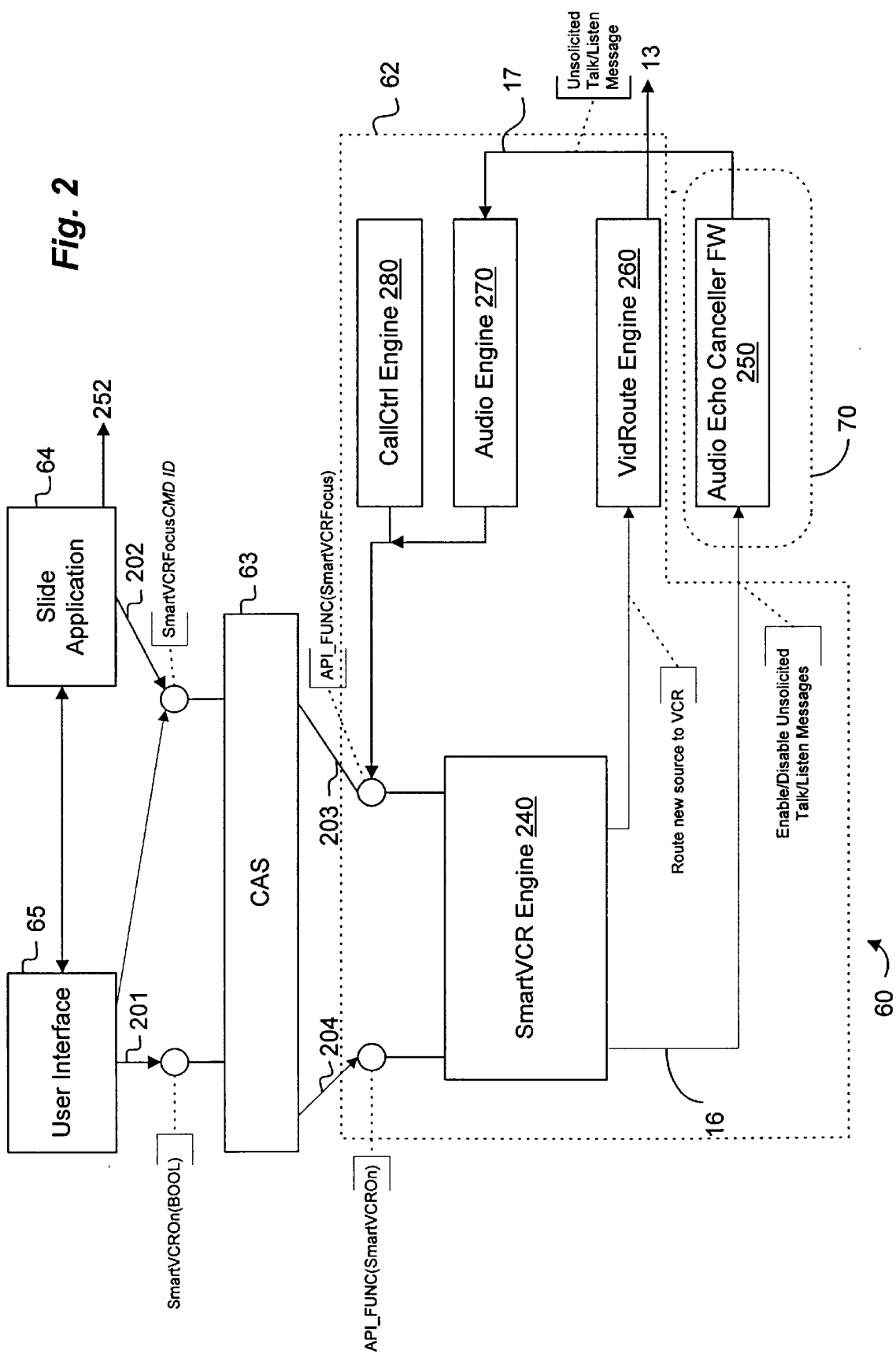
FIG. 2 shows a block diagram of videoconference system modules in accordance with the invention.

The operation of record controller 62 is more specifically described below with reference to FIGS. 2, 3 and 4A–4E. FIG. 2 shows user interface 65, slide application 64, CAS 63, record controller 62 and audio processor 70. Record controller 62 includes various exemplary submodules such as record control engine 240 (referred to hereinafter as smartVCR engine 240), audio echo canceler firmware (FW) 250, vidroute engine 260, audio engine 270 and call control engine 280. SmartVCR engine 240 provides a core processing module or engine that expects notifications of specific events from various components of videoconference system 1 such as engines 260, 270, 280 and firmware 250. These notifications provide smartVCR engine 240 with event information to determine the current focus of the conference. SmartVCR engine 240 handles aspects of focus source selection other than the sending of event notifications.

SmartVCR engine 240 receives event notifications and responsively selects the focus source of the conference. Vidroute Engine 260 responsively controls video switch 30 to select the focus source for recording by VCR 20. Audio echo canceler FW 250 sends talk/listen event notifications and allows disabling of the talk/listen event notifications which are received by audio control engine 270. As shown in FIG. 2, audio echo canceler FW 250 runs on audio processor 70. Disabling the talk/listen event notifications prevents unnecessary and distracting switches between a graphical slide source and a physical camera source. Call control engine 280 provides a hang-up event notification to SmartVCR engine 240. The hang-up event causes SmartVCR engine 240 to switch recording to a local source if necessary to ensure that remote video is not being recorded after the remote site has disconnected.

Record controller 62 interacts with rest of system 10 via CAS 63 and coupling 262. CAS 63 provides an interface between the 32-bit user interface and slide applications 65, 64, and the 16-bit smartVCR engine 240 of record controller 62. Couplings 201, 204 provide an on/off coupling for transmitting on/off notifications from user interface 65 to smartVCR engine 240. Couplings 202, 203 provide a graphical event coupling for transmitting graphical event information from slide application 64 to smartVCR engine 240. Coupling 17 is a physical event coupling for transmitting talk/listen event information from audio echo canceler FW 250 via audio engine 270 to smartVCR engine 240.

User interface 65 is a 32-bit software application executing on computer system 60 which provides an interface between a local user and record controller 62 to turn recording of the conference on or off. User interface 65 provides on/off notifications to smartVCR engine 240 via CAS 63 and couplings 201, 204. User interface 65 provides for remote and local camera selection, preset and positioning event notifications to smartVCR engine 240 via CAS 63.

Slide application 64 is a graphical information creation and/or edit application executing on computer system 60 to allow conference participants to create and/or annotate slides during the videoconference. Slide application 64 provides slide annotation event information to smartVCR engine 240 via CAS 63 and couplings 202, 203.

Record controller 62 receives event information from audio processor 70 and from slide application 64. The event information includes talk/listen notifications which are provided by audio echo canceler FW 250 to audio engine 270 and are forwarded to smartVCR engine 240 to inform smartVCR engine 240 whether a conference participant is talking and thus may be the focus of the conference. The event information also includes slide annotation notifications from slide application 64 to inform smartVCR engine 240 whether a conference participant is annotating a slide which may be the focus of the conference.

SmartVCR engine 240 receives notifications of physical and graphical events and on/off notifications from CAS 63 and responsively controls the input applied to VCR 20 by providing commands to vidroute engine 260 and audio echo canceler FW 250. SmartVCR engine 240 determines the focus of the conference and directs the selection of the conference focus as the recorded stream of conference information by providing stream selection commands to vidroute engine 260. Vidroute engine 260 in turn controls video switch 30 to select the focus source provided to recording device input 19.

SmartVCR engine 240 further controls the selection of the recorded stream of conference information by providing commands to audio echo canceler FW 250 to enable or disable unsolicited talk/listen messages. Talk/listen notification may be disabled to prevent repeated switching between a talking conference participant and slide being annotated.

Figure 3:
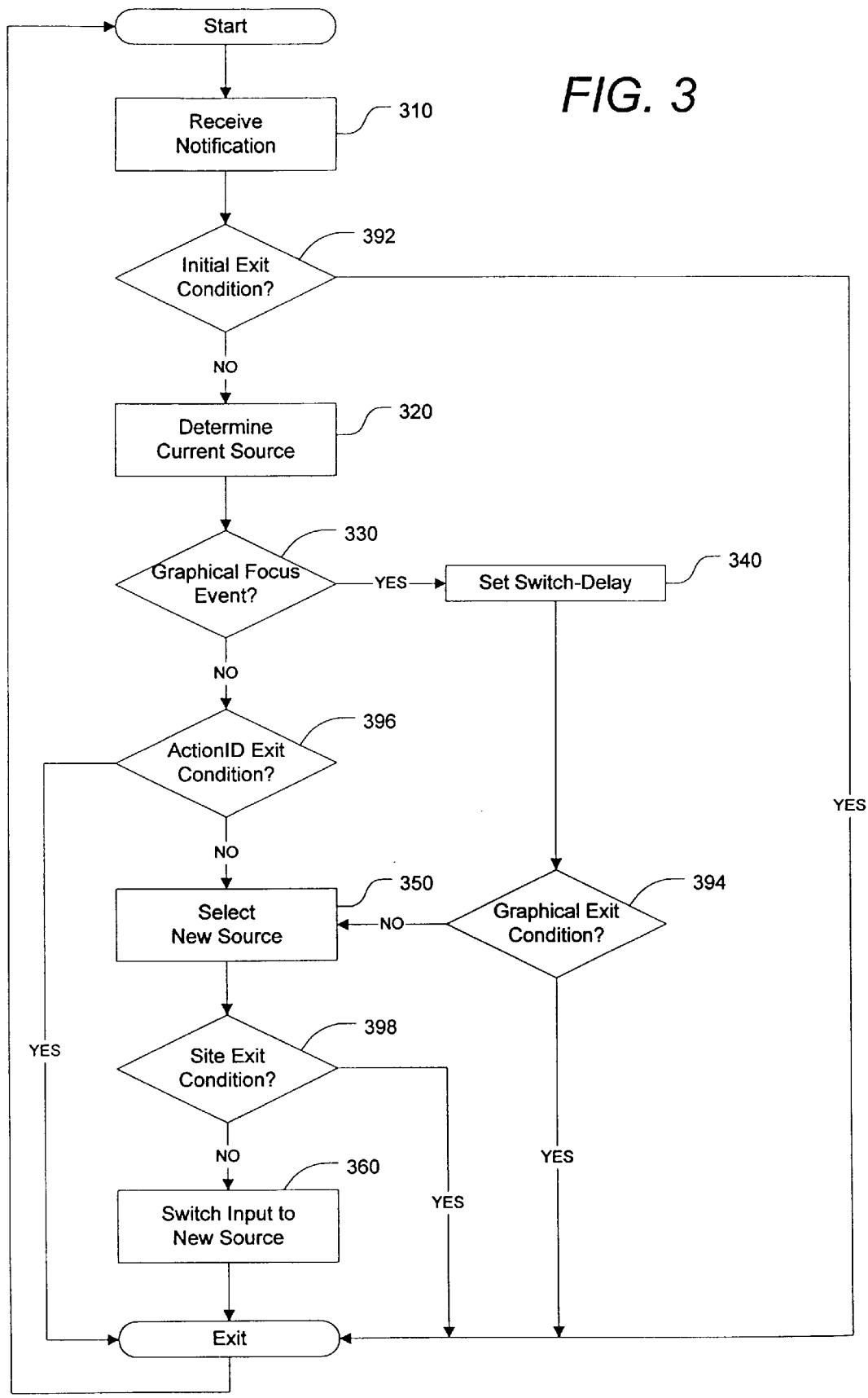
FIG. 3 shows a flow chart of the operation of one embodiment of a videoconference system in accordance with the invention.

Referring to FIG. 3, after operation of VCR 20 has been initiated and during receive notification operation 310, smartVCR engine 240 receives notification of an event which may require switching of the conference focus source coupled to recording device input 19. Events that may require switching of the conference focus include actions of conference participants such as a conference participant beginning to speak, a different conference participant speaking, a slide annotation occurring, etc. A notification includes event information such as an action identifier (actionID) identifying the source providing the notification and information identifying the type of conference information being provided such as a talk/listen flag and/or a data packet indicating that a slide annotation is being transmitted. A notification is provided, for example, to smartVCR engine 240 from slide application 64 in the case of a slide annotation or from audio engine 270 in the case of a speaker speaking. For example, if a remote conference participant at a remote conference site begins speaking or if the remote conference participant begins annotating a slide, event information indicates that the focus source may require switching to the remote source if the remote source is not already selected as the focus source.

After the above described receive notification operation 310 and during initial exit decision 392, initial exit conditions are checked to determine if further processing should be continued. For example, smartVCR engine 240 determines if the record controller 62 is enabled. Also, smartVCR engine 240 determines if VCR 20 is in a record mode. If either of these determinations are negative, execution of smartVCR engine 240 is exited with respect to the currently received event information. SmartVCR engine 240 then awaits further event information during receive notification operation 310.

After initial exit decision 392 and during determine current source operation 320, the current source is designated to be the source currently coupled to recording device input 19. A current source variable curVCRSrc is set equal to the source which is currently coupled to recording device input 19 via video switch 30.

After determine current source operation 320 and during graphical focus event decision 330, smartVCR engine 240 determines from the event information if the event is a graphical focus event. SmartVCR engine 240 determines if the conference information corresponding to the received event information indicates physical conference information (e.g., a video image of a speaker) or graphical conference information (e.g., a slide annotation and/or computer graphics) by determining whether the actionID of the event is one of a set of action identifiers indicating a graphical event. An exemplary action identifier indicating a graphical event is a graphical focus identifier identifying slide application 64 or a graphical remote source as the event source providing the event information. If the conference information includes graphical information (e.g., slide application 64 or a graphical remote source is the event source), control transitions to set switch-delay operation 340. Otherwise, control transitions to actionID exit decision 396.

During set switch-delay operation 340, a switch-delay time is set. SmartVCR engine 240 sets a time if the notification identified a graphical event source. Voice activated switching will be disabled until the switch-delay time has passed. For example, when a user is speaking while simultaneously annotating on a slide, smartVCR engine 240 prevents repeated switching of recording device input 19 between the speaker's source and the slide's source by disabling talk/listen notifications so that talk event information indicating a switch to a speaker's source is disregarded. After set switch-delay operation 340, control transitions to graphical exit decision 394.

During graphical exit decision 394, smartVCR engine 240 determines if any of various graphical exit conditions are satisfied and exits operations regarding the current event information if at least one of such exit conditions is satisfied. Graphical exit decision 394 is described more fully with reference to FIG. 4B. Upon exit, smartVCR engine 240 awaits further event information which may subsequently be received during receive notification operation 310. If no exit condition is satisfied, control transitions from graphical exit decision 394 to select new source operation 350.

During actionID exit decision 396, smartVCR engine 240 determines if any of various actionID exit conditions are satisfied and exits operations regarding the current event information if at least one of such exit conditions is satisfied. ActionID exit decision 396 is described more fully with reference to FIG. 4A. Upon exit, smartVCR engine 240 awaits further event information which may subsequently be received during receive notification operation 310. If no such exit condition is satisfied, control transitions from actionID exit decision 396 to select new source operation 350.

If no exit conditions are satisfied in either of graphical exit decision 394 or actionID exit decision 396, control transitions to select new source operation 350. During select new source operation 350, smartVCR engine 240 designates the source providing the event information (e.g., the event source) as the new source. For example, if the event information includes graphical information, a new source variable newVCRsrc is set equal to the graphical source (e.g., a computer system display identifier PCdisplay) providing the information. If the event information includes local information, the new source (newVCRsrc) is set to the local source currently being transmitted from the local site. If the event information includes remote information, the new source (newVCRsrc) is set to the remote source currently being received at the local site.

Control then transitions to site exit decision 398. During site exit decision 398, smartVCR engine 240 determines if any of various site exit conditions are satisfied and exits operations regarding the current event information if at least one of such exit conditions is satisfied. Site exit decision 398 is described more fully with reference to FIGS. 4C and 4D. Upon exit, smartVCR engine 240 awaits further event information which may subsequently be received during receive notification operation 310. If no such exit condition is satisfied, control transitions from site exit decision 398 to switch input operation 360.

If a source switch is determined to be required by smartVCR engine 240 (e.g., none of the above described exit conditions are satisfied), control transitions to switch input operation 360. During switch input operation 360, smart- VCR engine 240 directs vidroute engine 260 to switch the recording device input 19 from the current source to the new focus source (e.g., the event source). Vidroute engine 260 in turn causes video switch 30 to switch the recording device input 19 from the current source to the event source.

Figure 4A:
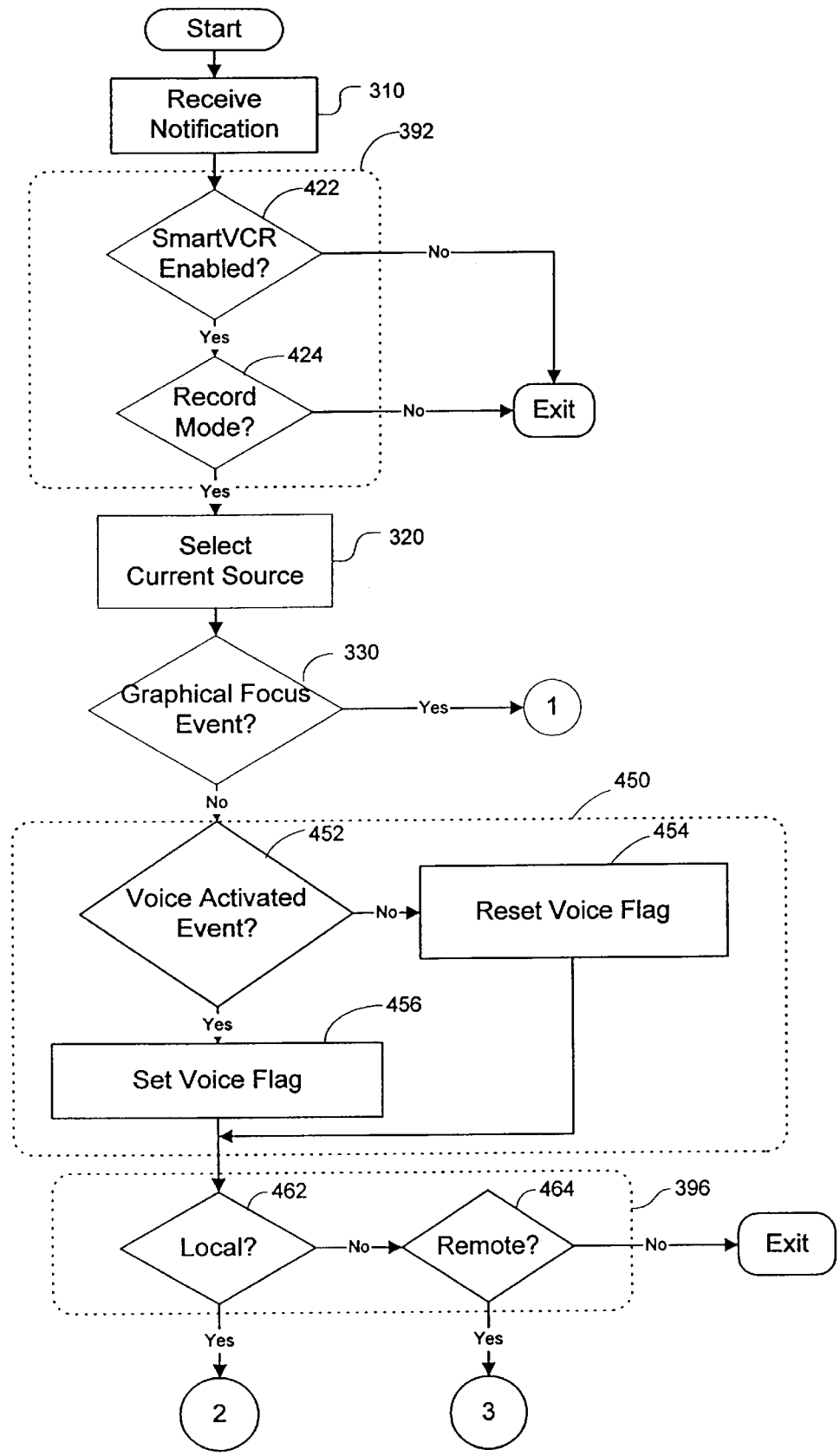
FIGS. 4A through 4E show a flow chart of the operation of one embodiment of a videoconference system in accordance with the invention.

Referring to FIG. 4A, during receive notification operation 310, smartVCR engine 240 receives notifications of events that may require switching of the conference focus from one source to another. For example, if a remote conference participant at a remote conference site begins speaking or if a remote conference participant begins annotating a slide, event information indicates that the focus source may require switching to the remote source if the remote source is not already selected as the focus source.

After receive notification operation 310 and during initial exit decision 392, initial exit conditions are checked to determine if further processing should be continued. For example, smartVCR engine 240 determines if the record controller 62 is enabled during decision 422. If the record controller 62 is disabled, smartVCR engine 240 exits operations regarding the current event information and awaits further event information during receive notification operation 310. If the record controller 62 is enabled, control transitions to decision 424. During decision 424, smartVCR engine 240 determines if VCR 20 is in a record mode. If VCR 20 is not in a record mode, smartVCR engine 240 exits operations regarding the current event information and awaits further event information during receive notification operation 310. If VCR 20 is in a record mode and if record controller 62 is enabled, control transitions to determine current source operation 320.

After initial exit decision 392 and during determine current source operation 320, the current recorded source is selected. For example, the current recorded source is initialized to be the current video source routed to VCR 20. SmartVCR engine 240 sets a current source variable curVCRSrc equal to a value identifying the one of cameras 10, slide application 64 and network interface 90 that is currently routed to VCR 20 by video switch 30.

After determine current source operation 320 and during graphical focus event decision 330, smartVCR engine 240 determines from the event information if the event is a graphical focus event. For example, smartVCR engine 240 determines if the received event information includes an actionID that is within a set of valid graphical source or action identifiers. If the actionID identifies a graphical source, control transitions to graphical source operations 432 shown in FIG. 4B. If the actionID is not a graphical source identifier such as an identifier for a personal computer system, control transitions to voice activated operation 450.

During voice activated operation 450, smartVCR engine 240 determines from the event information if the event is voice activated and sets a voice flag VoiceActivated accordingly. For example, during voice activated decision 452, smartVCR engine 240 determines if the event notification was a voice activated notification. For example, smartVCR engine 240 determines if the conference event about which event information is received is due to a conference speaker starting to speak. The event information includes a talk/listen notification informing smartVCR engine 240 whether the conference event is voice activated. If the event notification was voice activated, control transitions to set voice flag operation 456. During set voice flag operation 456, smartVCR engine 240 sets the voice flag to a value indicating voice activated (e.g., VoiceActivated=TRUE). If the event notification was not voice activated, control transitions to reset voice flag operation 454. During reset voice flag operation 456, smartVCR engine 240 resets the voice flag to a value indicating nonvoice activated (e.g., VoiceActivated= FALSE). After either set voice flag operation 456 or reset voice flag operation 454, control transitions to actionID exit decision 396.

During actionID exit decision 396, smartVCR engine 240 determines whether various actionID exit conditions are satisfied and exits operation if such exit conditions are satisfied. For example, during local decision 462, smartVCR engine 240 determines if the actionID of the event is within a set of local source identifiers. If the actionID of the event is within a set of local sending camera focus identifiers, control transitions from local decision 462 to local source operations 434 shown in FIG. 4C. If the actionID of the event is not within a set of local source identifiers, control transitions from local decision 462 to remote decision 464. During remote decision 464, smartVCR engine 240 determines if the actionID of the event is within a set of remote source identifiers. If the actionID of the event is within a set of remote source identifiers, control transitions from remote decision 464 to remote source operations 436 shown in FIG. 4D. If the actionID of the event is not within a set of local or remote source identifiers, operation of smartVCR engine 240 is exited because the actionID is an illegal and/or unrecognized actionID for purposes of determining the conference focus source to switch recording device input 19.

Figure 4B:
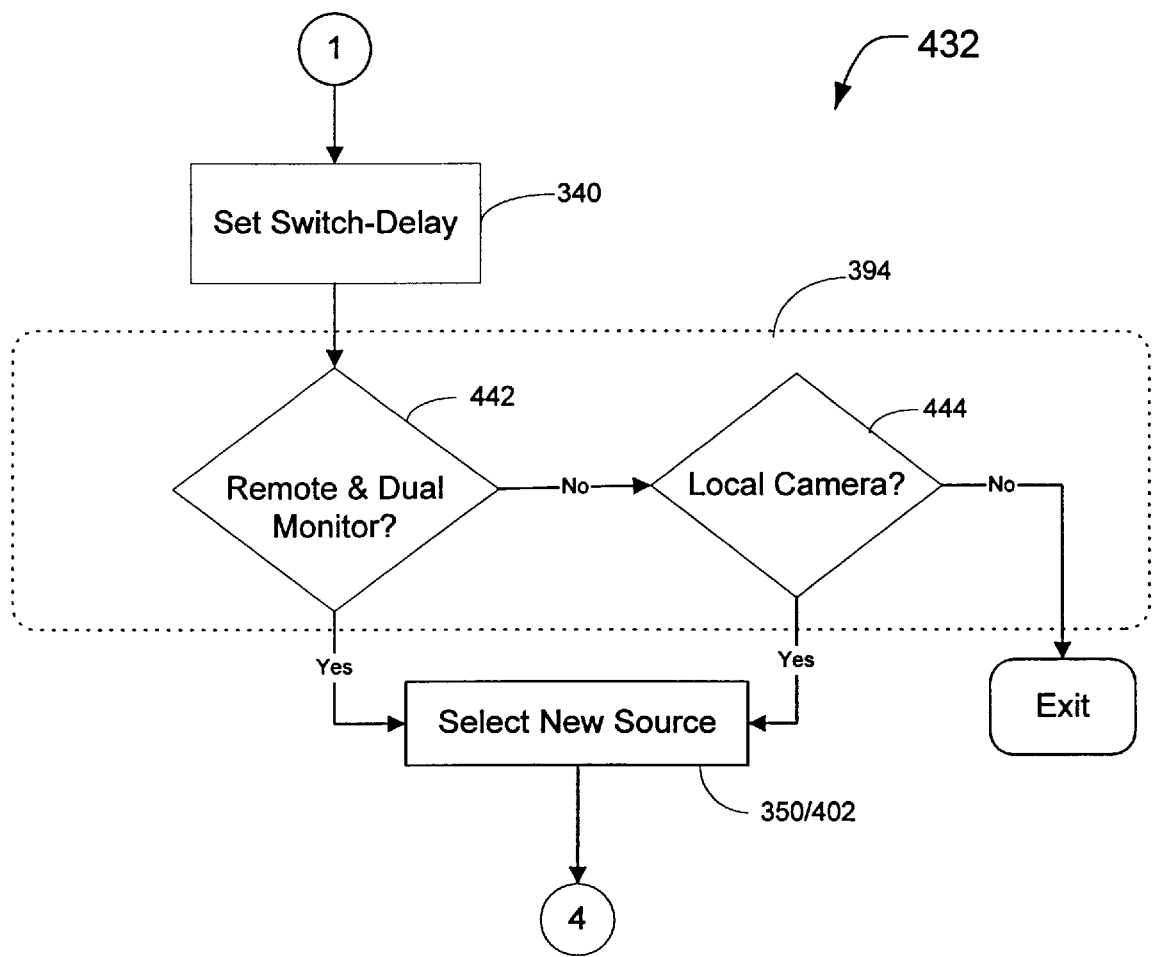

FIG. 4B shows graphical source operations 432. During set switch-delay operation 340, a switch-delay time is set. SmartVCR engine 240 sets the switch-delay time if the event information includes graphical information such as user annotations to a slide. The switch-delay time is set to prevent voice activated switching away from the slide to a conference participant during the period of the switch-delay time. SmartVCR engine 240 disables voice activated switching until the switch-delay time has passed. The switch-delay time is a clock time and is set equal to the current clock time plus the minimum length of time to record the computer system display. The minimum length of time to record the computer system display is a user programmable time length. Thus, for example, when a user is speaking while simultaneously annotating on a slide, smartVCR engine 240 attempts to prevent repeated switching of source 19 of VCR 20 between the speaker and the slide by maintaining the slide as the focus until the minimum time has elapsed. After set switch-delay operation 340, control transitions to graphical exit decision 394.

During graphical exit decision 394, smartVCR engine 240 determines if any of various graphical exit conditions are satisfied and exits operation if at least one of such exit conditions is satisfied. If no such exit condition is satisfied, control transitions from graphical exit decision 394 to select new source operation 350/402.

For example, during remote and dual monitor decision 442, smartVCR engine 240 determines if the currently recorded source (e.g., curVCRSrc) is a remote source and if videoconference system 1 includes a two-monitor configuration. If the currently recorded source is a remote source and if videoconference system 1 includes a two-monitor configuration, control transitions to select new source operation 350/402 to select the event source as the new focus source to be coupled to recording device input 19. The event source is selected as the new source (which eventually will become the current source if no exit conditions are satisfied) because the event source is a graphical source showing a slide which will be shown on the second monitor and should be recorded by VCR 20. If the currently recorded source is not a remote source or if videoconference system 1 includes a single-monitor configuration, control transitions to local camera decision 444.

During local camera decision 444, smartVCR engine 240 determines if the currently recorded source is a local physical source such as a local camera. If the currently recorded video source is not a local camera, then execution of smartVCR engine 240 is exited because the event source is a graphical source and videoconference system 1 includes a single monitor configuration so that the graphical event source is already displayed and recorded. If the currently recorded source is a local camera, control transitions to select new source operation 350/402 because the current source is a local physical source and the event source is a graphical source showing a slide. Thus, the graphical event source should be selected for recording so that input 19 is switched from the local camera to the graphical event source.

If no graphical exit conditions are satisfied during graphical exit decision 394, control transitions to select new source operation 350/402. During select new source operation 350/402, smartVCR engine 240 designates the event source as a new source. SmartVCR engine 240 sets a new source variable newVCRsrc equal to the event source (e.g., the source providing the event information). For example, as determined in graphical focus event decision 330, the event information includes graphical information. Therefore, the new source is set to the graphical source providing the information (e.g., slide application 64).

Figure 4C:
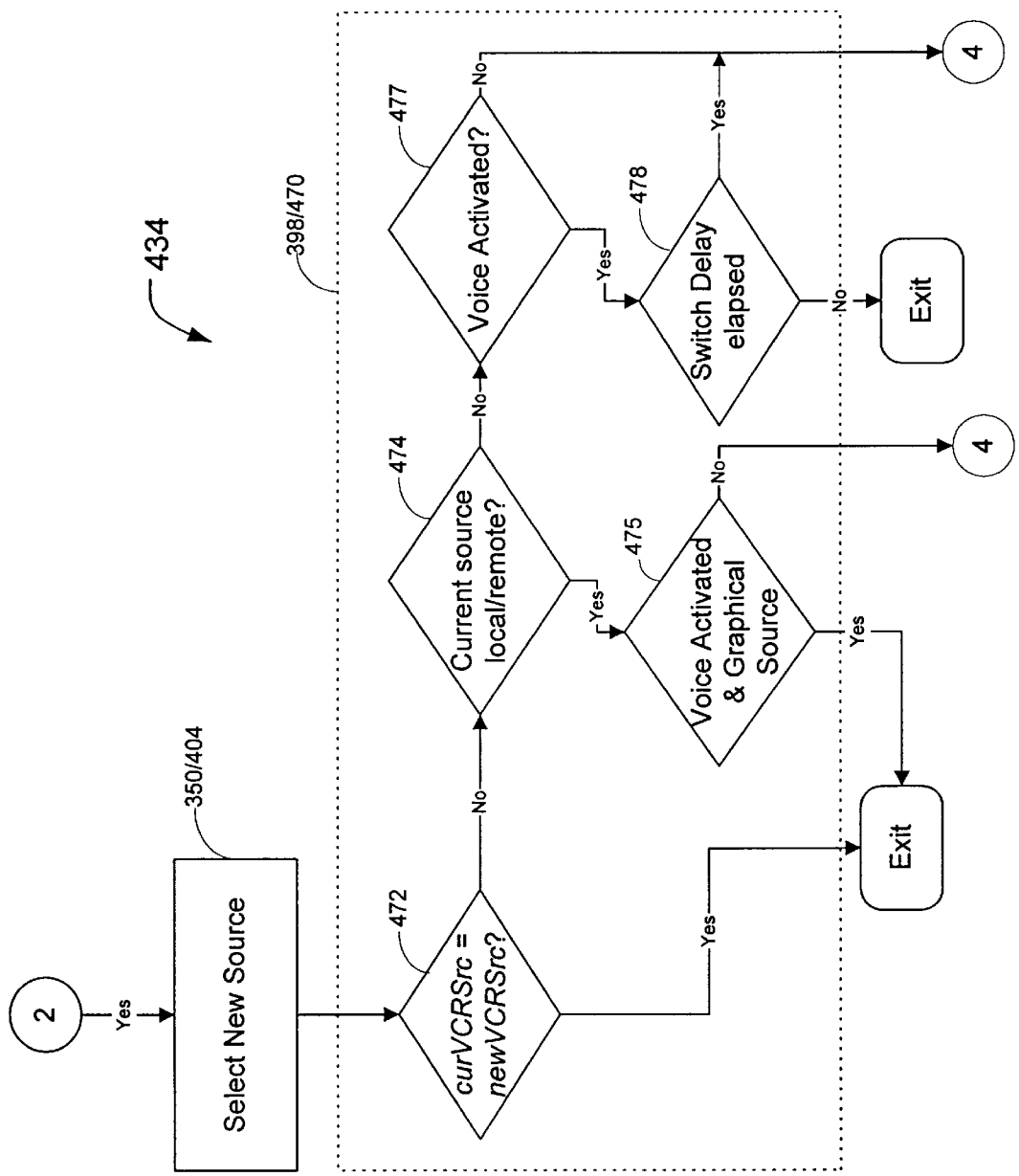
Figure 4D:
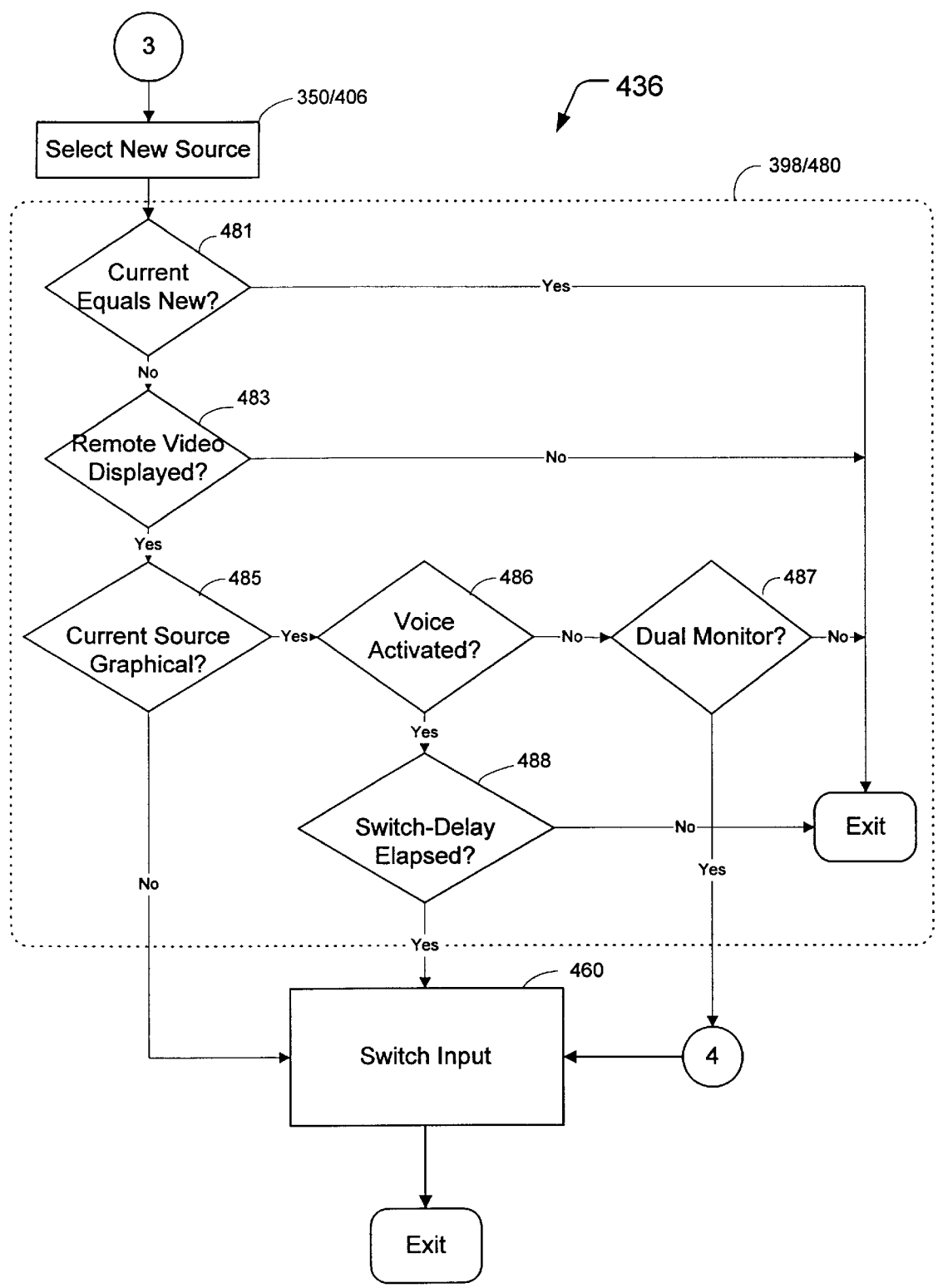
Figure 4E:
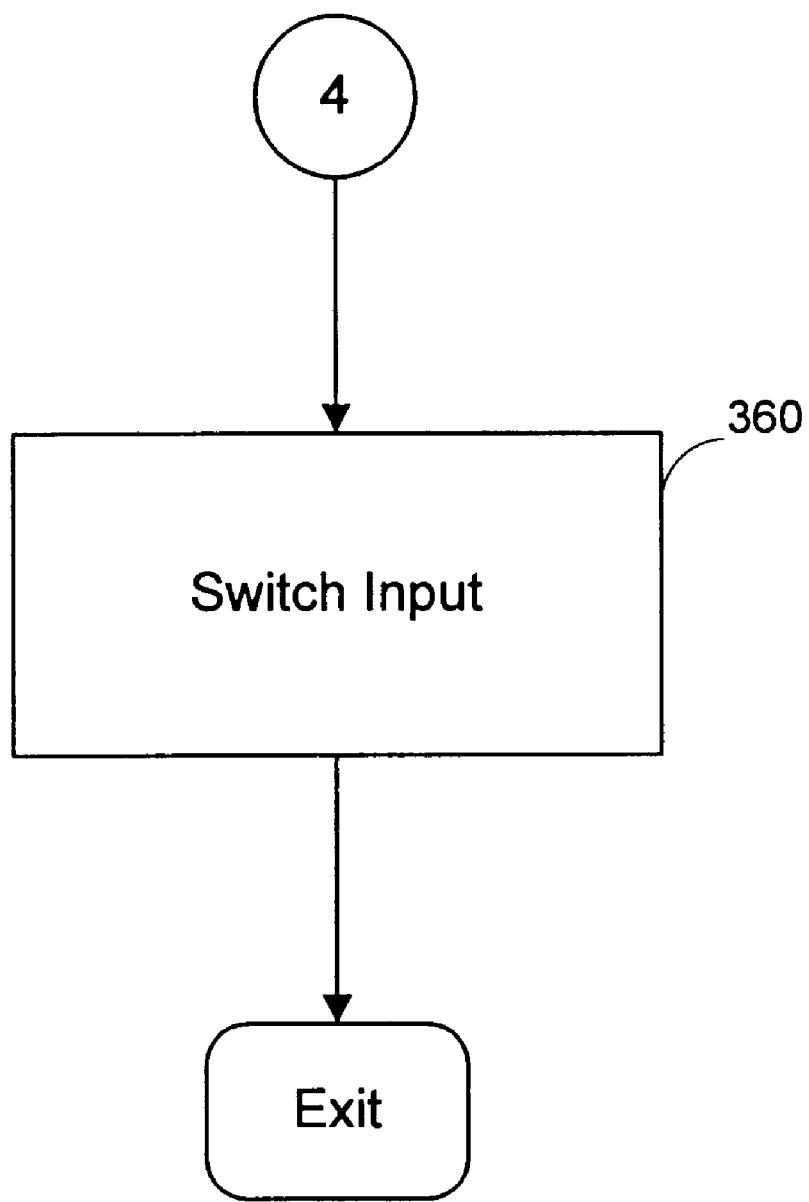

Control then transitions from select new source operation 350/402 to switch input operation 360 shown in FIG. 4E. During switch input operation 360, smartVCR engine 240 directs vidroute engine 260 to switch the recording device input 19 to receive the video being provided by the source designated by the new source variable newVCRsrc. For example, after transitioning from select new source operation 350/402 to switch input operation 360, vidroute engine 260 switches recording device input 19 to receive the graphical event source indicated by the actionID (e.g., slide application 64).

Referring to FIG. 4A and as discussed above, if the actionID indicates that the event source is a local source as determined in local decision 462, control transitions to select new source operation 350/404 of local source operations 434 which are shown in FIG. 4C. During select new source operation 350/404, smartVCR engine 240 sets the new source to the source currently being transmitted from local videoconference system 1 (e.g., one of cameras 10 and slide application 64). At operation 350/404, the event source is a local, physical source (e.g., one of cameras 10) because the event source is physical (refer to actionID operation 330 described above) and local (refer to local decision 462 described above). Also, after operation 350/404, the new source is a local source such as one of cameras 10 and slide application 64.

Referring again to FIG. 4A, if the actionID indicates a remote source is providing the event information as determined in remote decision 464, control transitions to select new source operation 350/406 of remote source operations 436 which are shown in FIG. 4D. During select new source operation 350/406, smartVCR engine 240 sets the new source equal to the event source. For example, if the event information includes remote information, the new source is set to the remote source currently being received at the local site via network interface 90.

After either of new source decisions 350/404, 350/406, control transitions to site exit decision 398. Site decision 398 includes local exit decision 470 and remote exit decision 480. Referring to FIG. 4C, control transitions from new source decision 350/404 to local exit decision 398/470. Referring to FIG. 4D, control transitions from new source decision 350/406 to local exit decision 398/480.

FIG. 4C shows local source operations 434. Control transitions from new source decision 350/404, discussed above, to local exit decision 398/470. During local exit decision 398/470, smartVCR engine 240 determines if any of various local site exit conditions are satisfied and exits operation if at least one of such exit conditions is satisfied. If no such exit condition is satisfied, control transitions from local exit decision 398/470 to switch video input operation 360 which is shown in FIG. 4E.

For example, during source comparison operation 472, the current recorded source curVCRSrc is compared to the new source newVCRSrc (e.g., curVCRSrc=newVCRSrc?). If the current source is the same as the new source (e.g., the above parenthetical expression evaluates as true), operation of smartVCR engine 240 is exited until another event notification is received. If the current source is not the same as the new source (e.g., the above parenthetical expression evaluates as false), control transitions to current source site operation 474.

Prior to the comparison of the current source to the new source during source comparison operation 472, SmartVCR engine 240 knows that the event notification indicated that the conference focus source is the local sending source. That is, the conference focus source includes the local video information being transmitted to a remote site via network interface 90 (refer to local decision 462 described above). Notifications of this type (see, e.g., table 1 below, 2nd column) come from either a camera control application (e.g., UI application 65), audio engine 270, or call control engine 280 after a call hang-up. Since the notification indicated that the local sending source is the current conference focus, newVCRSrc is set to the current local sending source (determined in operation 350/404). The current local sending source, in this case the event source, could be any local camera (e.g., one of cameras 10) or the computer system video output (e.g., slide application 64).

If the current and new sources are determined to be the same during source comparison operation 472, the new and current sources are the same one of cameras or slide application 64 (operations 350/404, 472). Thus, in a first case where the event and current sources are one of cameras 10, operation is exited because there is no need to switch the source coupled to input 19 because the event source is already coupled to input 19 and VCR 20 is already recording an event source camera. In a second case where the event source is a camera (e.g., the event notification is that the local site participant is speaking as determined in decisions 462 & 477) and the current source is slide application 64, then the smartVCR engine should switch the recording device input to be the local sending source (e.g., the local video information being transmitted to a remote site), but only if the local sending source is the camera (e.g., one of cameras 10) and the switch-delay time, which may have been started on a previous event notification, has elapsed. If the current source is different from the new source, control transitions to current source site operation 474.

During current source site operation 474, smartVCR engine 240 determines if the current source is a local physical source (e.g., one of cameras 10) or a remote source (e.g., a source received via network interface 90). If the current source is one of cameras 10 or a network interface source, control transitions to decision 475. If the current source is a local, graphical source (e.g., slide application 64), control transitions from decision 474 to decision 477.

After decision 474 and during decision 475, smartVCR engine 240 determines if the voice activated flag is set and if the new source is a graphical source. For example, if the voice activated flag is set (e.g., VoiceActivated=TRUE) and if the new source is a graphical source (e.g., newVCRSrc= PC evaluates TRUE), operation of smartVCR engine 240 is exited until another event notification is received. No input switch to the source designated by the new source variable newVCRSrc is desired because each of the event source and current source are a local, physical source (e.g., one of cameras 10 as determined in decisions 330, 462) indicated as a focus by a speaker speaking (decision 475), but the new source variable newVCRSrc is set to the currently transmitted local source (e.g., slide application 64 as determined in decision 475).

If, during decision 475, the voice activated flag is not set (e.g., VoiceActivated=FALSE) or if the new source is not a graphical source (e.g., newVCRSrc=PC evaluates FALSE), control transitions to switch input operation 360. An input switch to the source designated by the new source variable newVCRSrc is desired because in a first case, the event and new sources are a local, physical source (e.g., one of cameras 10) and the current source is a remote source or a local source other than the source designated by the newVCRSrc variable. An input switch is desired in a second case because the event source and current source are one of cameras 10, new source is slide application 64 and the focus event is a nonvoice activated or graphical event.

After decision 474 and during decision 477, smartVCR engine 240 determines if the voice activated flag is set (e.g., VoiceActivated=TRUE?). If the voice activated flag is not set, control transitions to switch input operation 360 because each of the event source and the new source is a local, physical source (e.g., one of cameras 10), and the current source is a local, graphical source (e.g., slide application 64 as determined in decision 474). Consequently, input 19 should be switched from its current source (e.g., slide application 64) to receive conference information from the new, event source (e.g., one of cameras 10). If the voice activated flag is set, control transitions to switch-delay time decision 478. If the switch-delay time has not passed (e.g., the switch-delay time value is less than the current clock time value), operation of smartVCR engine 240 is exited until another event notification is received because the minimum time for slide annotation has not elapsed and the current source (e.g., slide application 64) is still being viewed and/or recorded. If the switch-delay time has passed (e.g., the switch-delay time value is greater than the current clock time value), control transitions to switch input operation 360 because annotation has completed on the graphical source and the switch-delay time has elapsed giving sufficient time to view/record the slide before switching away to the current speaker shown by the new, event source (e.g., one of cameras 10).

Referring again to FIG. 4A, and as discussed above, if the actionID indicates that a remote source is providing the event information as determined in remote decision 464, control transitions to select new source operation 350/406 of remote source operations 436 which are shown in FIG. 4D. During select new source operation 350/406, smartVCR engine 240 designates the remote video source being received as the new source. For example, if the event information includes remote information, the new source is set to receive conference information from network interface 90 which is receiving and transmitting the remote information currently being received at the local site.

After new source decision 350/406, control transitions to remote exit decision 398/480. During remote exit decision 398/480, smartVCR engine 240 determines if any of various remote site exit conditions are satisfied and exits operation if at least one of such exit conditions is satisfied. If no such exit condition is satisfied, control transitions from remote exit decision 398/480 to switch input operation 360.

For example, during source comparison operation 481, the current recorded source curVCRSrc is compared to the new source newVCRSrc (e.g., curVCRSrc=newVCRSrc?). If the current source is the same as the new source, operation of smartVCR engine 240 is exited until another event notification is received because the event, current and new sources are the same (e.g., remote) and VCR 20 is already recording the event source and no video input switch is necessary. If the current source is different from the new source, control transitions to remote video displayed operation 483 for further analysis.

During remote video displayed operation 483, smartVCR engine 240 determines if remote video is being displayed by monitor 50. If remote video is not displayed by monitor 50, then operation of smartVCR engine 240 is exited until another event notification is received because the remote video stream is only available for display if the video processor is actually processing the remote video stream for that purpose. If the video processor is not processing the remote video stream for display, then smartVCR engine 240 exits because there is no remote video stream available for switching to the VCR 20.

If during remote video displayed operation 483 smartVCR engine 240 determines that remote video is being displayed by monitor 50, control transitions to current source graphical decision 485. During current source graphical decision 485, smartVCR engine 240 determines if the currently recorded source curVCRSrc is a graphical source. If the currently recorded source curVCRSrc is not a graphical source, control transitions to switch input operation 360 because the new event source (i.e., newVCRSrc) is a remote video source, and the current source (i.e., curVCRSrc) is a local physical source (as determined by decisions 481 and 485 evaluating to FALSE).

If the currently recorded source curVCRSrc is a graphical source, control transitions to voice activated decision 486. During voice activated decision 486, smartVCR engine 240 determines is the voice activated flag is set. If the voice activated flag is not set control transitions to dual monitor decision 487. During dual monitor decision 487, smartVCR engine determines if videoconference system 1 includes a dual monitor configuration. If videoconference system 1 includes a dual monitor configuration, control transitions to switch input operation 360 because the new, event source is a remote, displayed, nonvoice activated source, and the current source is a local graphical source (e.g., slide application 64). One remote stream of conference information is received via network interface 90. Dual monitor configurations have a remote video stream and a local graphical video stream. Each of these two video streams are available for display and recording at the same time. Therefore, if input 19 to VCR 20 is currently the local graphical video stream, then a switch to the remote video stream can and should be done. However, if dual monitor decision 487 evaluates to FALSE (indicating a 1 monitor configuration), smartVCR engine 240 is exited because single monitor configurations combine remote video and local graphical video into a single video stream. No switch is necessary in single monitor configurations when the conference focus switches between remote video and local graphical video.

If videoconference system 1 does not include a dual monitor configuration, operation of smartVCR engine 240 is exited until another event notification is received because the displayed remote stream is already being received from the remote graphical source. If the voice activated flag is set during voice activated decision 486, the remote event source is a physical source and control transitions from to decision 488. During decision 488, smartVCR engine 240 determines if the switch-delay time has passed (e.g., if the current clock time value is greater than the switch-delay time value). If the switch-delay time has not passed, operation of smartVCR engine 240 is exited until another event notification is received because the switch-delay time prevents the remote stream from switching from the current remote graphical source to the new remote physical source. If the switch-delay time has passed (e.g., if the current clock time value is greater than the switch-delay time value), control transitions to switch input operation 360 because the current source is a local graphical source, the new event source is a remote physical source, and the switch-delay time has passed.

If a source switch is determined to be required by smart-VCR engine 240 (e.g., none of the above described exit conditions are satisfied), control transitions to switch input operation 360. During switch input operation 360, smart-VCR engine 240 directs vidroute engine 260 to switch the source input to VCR 20 to receive the newly determined focus source represented at the present stage of analysis by the new source variable newVCRSrc.

Table 1 shows the various commands or events that cause event notifications to be sent to the smartVCR engine 240. The commands or events are categorized into three groups, each corresponding to a video display stream that is most likely to be the visual focus of attention of the conference participants at the time a particular command or event occurs. "Graphical/PC Video" is the video stream generated from a computer system that is integrated into the local conference system (e.g., computer system 60). Graphical/PC Video will be the assumed conference focus for all event notifications sent as a result of commands or events in the Graphical/PC Video category. "Local/Sending Source" is the video stream from the local site camera (e.g., one of cameras 10) that is currently being transmitted to a remote conference site. Local/Sending Source Video will be the assumed conference focus for all event notifications sent as a result of commands or events in the Local/Sending Source category. "Remote/Far Video" is the remote video stream from a remote conference site that is currently being received by the local conference site. Remote/Far Video will be the assumed conference focus for all event notifications sent as a result of commands or events in the Remote/Far Video category. The conference focus is the video stream determined by smartVCR engine 240 that should be recorded by the recording device VCR 20.

TABLE 1

| Graphical/PC Video | Local/Sending Source | Remote/Far Video |
| --- | --- | --- |
| Send Slide | Send camera | Far end talking |
| Receive Slide | Send PC (record VGA) | Remote Camera Select |

TABLE 1-continued

| Graphical/PC Video | Local/Sending Source | Remote/Far Video |
| --- | --- | --- |
| Slide Annotation | Local Goto Preset | (FECC) |
| Save Slide | Local camera PTZ | Remote Goto Preset |
| Previous Slide | Local side talking | (FECC) |
| Next Slide | Hangup (if recording | Remote camera PTZ |
| Load Slide | Far end) | (FECC) |
| Whiteboard | | |
| Clear Annotation | | |
| View PenPal | | |
| View PC | | |
| Send PC (record sending src) | | |
| App Share | | |

The Graphical/PC Video category includes various commands or events. For example, "Send Slide" is a user command used to transmit a slide to a remote conference site. "Receive Slide" is an event notifying an application (e.g., slide application 64) that a slide is being received from a remote site. "Save Slide" is a user command used to save a slide. "Previous Slide" is a user command used to re-display the previous slide. "Next Slide" is a user command used to display the next slide in a list. "Load Slide" is a user command used to display a particular slide. "Whiteboard" is a user command used to display a virtual whiteboard. "Clear Annotation" is a user command used to clear an annotation from a slide. "View PenPal" is a user command used to run slide application 64. "View PC" is a user command used to display the computer desktop screen. "Send PC" is a user command used to transmitt the computer display to the remote site. "AppShare" is a user command used to start an application sharing session with the remote site.

The local/Sending source category includes various commands or events. For example, "Send camera" is a user command used to select a new local camera to be transmitted to the remote site. "Local Goto Preset" is a user command used to cause the local camera to move to a preset position. "Local camera PTZ" is a user command used to cause the local camera pan, tilt or zoom to a new position. "Local side talking" indicates that a local site participant is speaking. "Hangup" indicates that the conference has been disconnected.

The Remote/Far Video category includes various commands or events. For example, "Far end talking" indicates that a remote site participant is speaking. "Remote Camera select" is a user command requesting the remote site to transmit a specific video source. "Remote Goto Reset" is a user command requesting the remote sight camera to move to a preset position. "Remote camera PTZ" is a user command requesting the remote site camera to pan, tilt or move to a new position.

The above described operations are implemented by a smartVCR engine software module including the following source code:

```
#define ID_CMD_SLIDE_SEND              0x00000001
#define ID_CMD_SLIDE_RECEIVE           0x00000002
#define ID_CMD_SLIDE_ANNOTATION        0x00000004
#define ID_CMD_SLIDE_SAVE              0x00000008
#define ID_CMD_SLIDE_PREVIOUS          0x00000010
#define ID_CMD_SLIDE_NEXT              0x00000020
#define ID_CMD_SLIDE_LOAD              0x00000040
#define ID_CMD_WHITEBOARD              0x00000080
#define ID_CMD_CLEAR_ANNOTATION        0x00000100
#define ID_CMD_VIEW_PENPAL             0x00000200
#define ID_CMD_VIEW_PC                 0x00000400
#define ID_CMD_SEND_PC                 0x00000800
#define ID_CMD_APP_SHARE               0x00001000
#define ID_CMD_SEND_CAMERA             0x00002000
#define ID_CMD_LOCAL_GOTO_PRESET       0x00004000
#define ID_CMD_LOCAL_CAMERA_PTZ        0x00008000
#define ID_CMD_LOCAL_TALKING           0x00010000
#define ID_CMD_CALL_HANGUP             0x00020000
#define ID_CMD_REMOTE_TALKING          0x00040000
#define ID_CMD_REMOTE_CAMERA_SELECT    0x00080000
#define ID_CMD_REMOTE_GOTO_PRESET      0x00100000
#define ID_CMD_REMOTE_CAMERA_PTZ       0x00200000
#define ID_CMDS_FOR_VGA_FOCUS          (ID_CMD_SLIDE_SEND|    \
                        ID_CMD_SLIDE_RECEIVE|   \
                        ID_CMD_SLIDE_ANNOTATION| \
                        ID_CMD_SLIDE_SAVE|      \
                        ID_CMD_SLIDE_PREVIOUS|  \
                        ID_CMD_SLIDE_NEXT|      \
                        ID_CMD_SLIDE_LOAD|      \
                        ID_CMD_WHITEBOARD|      \
                        ID_CMD_CLEAR_ANNOTATION| \
                        ID_CMD_VIEW_PENPAL|     \
                        ID_CMD_VIEW_PC|         \
                        ID_CMD_SEND_PC|         \
                        ID_CMD_APP_SHARE)
#define ID_CMDS_FOR_LOCAL_SENDING_FOCUS
(ID_CMD_SEND_CAMERA|    \
                        ID_CMD_LOCAL_GOTO_PRESET|\
                        ID_CMD_LOCAL_CAMERA_PTZ| \
                        ID_CMD_LOCAL_TALKING|   \
                        ID_CMD_CALL_HANGUP)
#define ID_CMDS_FOR_REMOTE_FOCUS
(ID_CMD_REMOTE_TALKING|     \
                        ID_CMD_REMOTE_CAMERA_SELECT|\
                        ID_CMD_REMOTE_GOTO_PRESET| \
                        ID_CMD_REMOTE_CAMERA_PTZ)
API_FUNC(SmartVCROn, REQUEST)
{
    gbSmartVCROn = ((LPSmartVCROnParamT)(M.DataPtr))->bOn:
    if(gbSmartVCROn)
    {
        char   buf[80];
        // check to see if the user has changed timing parameters
        VtelPathName( buf );
        lstrcat( buf, "vtel.ini" );
        wMinRecTimeForUIFCmds = GetPrivateProfileInt("Smart VCR",
"MinUserSelectRecTime", MIN_REC_TIME_FOR_UIF_CMDS, buf);
        // limit is 65 seconds
        if(wMinRecTimeForUIFCmds > 65)
            wMinRecTimeForUIFCmds = 65;
        wMinRecTimeForUIFCmds *= 1000; // convert seconds to milliseconds
    }
}
API_FUNC(SmartVCRFocus, BOTH)
{
    VidStreamT newSrc, curSrc;
    VidCurRouteT *p;
    DWORD dwCmd;
    BOOL bSwitchIt = FALSE;
    BOOL bVoiceActivated = FALSE;
    char buf[100];
    if(M.Cancel)
    {
        M.Error = VSUCCESS;
        M.Cancel = FALSE;
        M.Wait = FALSE;
        M.Timeout = 0;
        return;
    }
```

-continued

```
    // proceed only if SmartVCR is ON and VCR is in record mode
    if(gbSmartVCROn && bIsVCRInRecordMode( ))
    {
        // If there's a msg still waiting for routing to be
        // unlocked, throw it away and let this one override it.
        KillThisTimer(lpMsgWaitForRouteUnlock);
        // Get the Command ID to determine the focus of the conference
        if(M.SrcProcSrv == SRVID_AUD_FW_FARDATA_TL_FLAG) // talk/listen
msg
        {
            if(SavedTLState == 0) // if not waiting in spurious talk/listen process
            {
                SavedTLState = M.DataValue;
                dwTLThreshold = GetTickCount( ) + 2000;
                return;
            }
            else if (GetTickCount( ) < dwTLThreshold)
            {
                return; // ignore msg and keep waiting
            }
            else if(M.DataValue != SavedTLState)
            {
            SavedTLState = 0; // indicates not waiting
            return;
            }
            else // CurrentTLState == SavedTLState & 2000 ms completed
            {
                SavedTLState = 0;   // indicates not waiting
                dwCmd = M.DataValue; // get the TLState
            }
        }
        else if((M.SrcProcSrv == SRVID_CXT_NOTIFY_CALL_CTRL) || // call
handup msg
                (M.SrcProcSrv == SRVID_API_SmartVCRFocus))        // the timer msg
            dwCmd = M.DataValue;     // engine modules just pass dwCmd in DataValue
        else
            dwCmd = ((LPSmartVCRFocusParamT)(M.DataPtr))->dwCmd;
        if(SavedTLState != 0) // cancel spurious talk/listen process
            SavedTLState = 0;
        // Get the current VCR recording source
        curSrc = GetVidSrc(SNK_VCR1_VIDEO);
        // Determine the video source that is the focus of the conference,
        // decide it we should switch to it, and setup timed events.
        if(dwCmd & ((DWORD)ID_CMDS_FOR_VGA_FOCUS))
        {
            newSrc = SRC_WMAX_VGA;
            dwOkTimeToSwitchFromVGA = GetTickCount( ) +
wMinRecTimeForUIFCmds;
            // Far -> VGA && Sending -> VGA && VGA -> VGA cases
            if((curSrc == SRC_DECODER1_VIDEO && lpVidCaps->nNumMonitors !=
1)||
                (curSrc != SRC_DECODER1_VIDEO && curSrc != SRC_WMAX_VGA))
                bSwitchIt = TRUE;
        }
        else if (dwCmd & ((DWORD)ID_CMDS_FOR_LOCAL_SENDING_FOCUS))
        {
            newSrc = GetSendingSrc( );
            bVoiceActivated = (dwCmd & ID_CMD_LOCAL_TALKING) ? TRUE:
FALSE;
            if(curSrc != newSrc && newSrc != SRC_VCR1_VIDEO)
            {
                // Far -> Sending && Sending camera -> Sending cases
                if(curSrc != SRC_WMAX_VGA)
                {
                    if(!(bVoiceActivated && newSrc == SRC_WMAX_VGA))
                        bSwitchIt = TRUE;
                }
                // VGA -> Sending && Sending VGA -> Sending cases
                else if(!bVoiceActivated || (bVoiceActivated &&
                    (GetTickCount( ) > dwOkTimeToSwitchFromVGA)))
                bSwitchIt = TRUE;
            }
        }
        else if (dwCmd & ((DWORD)ID_CMDS_FOR_REMOTE_FOCUS))
        {
            newSrc = SRC_DECODER1_VIDEO; // Far video source
            bVoiceActivated = (dwCmd & ID_CMD_REMOTE_TALKING) ? TRUE:
FALSE;
            if(curSrc != new Src && bVidWndDisplayed(SNK_WINDOW1))
```

-continued

```
        {
            // VGA → Far && Sending VGA → Far
            if(curSrc == SRC_WMAX_VGA)
            {
                if((lpVidCaps→nNumMonitors != 1) && (!bVoiceActivated ||
                    (bVoiceActivated && (GetTickCount( ) >
dwOkTimeToSwitchFromVGA))))
                    bSwitchIt = TRUE;
            }
            // Sending camera → Far
            else
                bSwitchIt = TRUE;
        }
    }
    else // no match dude, we're outa here
    {
        M.Error = ERRID_VID_INVALID_CMD_ID;
        return;
    }
    if(bSwitchIt && M.Error == VSUCCESS)
    {
        MsgReallocate(&M, sizeof(VidCurRouteT), 0);
                    p = M.DataPtr;
        p→Target = newSrc;
                    p→RouteInfo.wNumStrms = 1;
                    p→RouteInfo.Streams[0] = SNK_VCR1_VIDEO;
        M.DstProcSrv = SRVID_VID_ROUTE_STAT;
        M.HitMe = FALSE;
        // If routing is currently locked, wait until SetRoutingLocked(FALSE)
        // cancels the lock and the wait on this msg.
        if(GetRoutingLocked( ))
        {
            M.SrcProcSrv = SRVID_API_SmartVCRFocus;
            M.Wait = TRUE;
            M.Timeout = 20000; //sleep for 20 seconds
                M.Immediate = FALSE;
                lpMsgWaitForRouteUnlock = &M;
        }
    }
}
}
```

The above description is intended to describe at least one embodiment of the invention. The above description is not intended to define the scope of the invention. Rather, the scope of the invention is defined in the claims below. Thus, other embodiments of the invention include various modifications, additions, and/or improvements to the above description.

For example, although the above described operations have been implemented by the above included source code, other embodiments may use different source code or non-software based control methods such as application specific hardware and/or firmware implementations. For example, in one embodiment, record controller 62 is a software module. In another embodiment, record controller 62 is an application specific hardware module. In another embodiment, record controller 62 includes a specific hardware module. In another embodiment, record controller 62 includes a combination of various types of modules. A module may include software, hardware or a combination thereof.

In another embodiment, record controller 62 may be a special purpose or general purpose microprocessor or microcontroller operating under control of firmware or software modules. In another embodiment, record controller 62 is a software module operating on a personal computer system, microprocessor or microcontroller. In another embodiment, record controller 62 is a computer system operating under control of one or more of the above described modules. Thus, record controller 62 may include a microprocessor, or may be a microprocessor operating at least in part under control of software modules such as engines 240, 260, 270, 280. Thus, the operations of record controller 62 and/or engines 240, 250, 260, 270, 280 described herein may be executed at least in part on one or more microprocessors included within one or more computer systems and/or a videoconference system and/or equipment therefor. As used herein, the functionality of a module may be decomposed such that the module includes engines, modules, submodules and/or subengines.

In one embodiment, conference VCR 20 is a videocassette recorder (VCR). Other embodiments may include any of a variety of different types of recording devices 240. For example, VCR 20 may record all or portions of the conference using other types of analog storage devices or any of a variety of digital mass storage devices such as any of various magnetic and/or optical disk/disc drives such as CD-recordable (CD-R) or CD-write once (CD-WO or WORM) drives or potentially digital video/variable disc (DVD) type drives. Other existing or newly developed types of storage and/or recording devices are contemplated to be within the scope of the invention which is defined in the claims below.

In one embodiment, computer system 60 is a personal computer system. Other embodiments may include different types of computer systems. Computer systems are information handling systems which can be designed to give independent computing power to one user or a plurality of users. Computer systems may be found in many forms including but not limited to mainframes, minicomputers, workstations, servers, personal computers, notepads and embedded systems. A typical computer system includes at least one processing unit, associated memory and a number of input/output (I/O) devices. A computer system processes information according to a program and produces resultant output information via the I/O devices. A program is a list of internally stored instructions such as a particular application program and/or an operating system. A software module may includes a program. The programs that control the operation of a computer system are commonly referred to as software applications or simply software.

Each videoconference system at the conference sites of a videoconference communicates received remote conference information to users at the corresponding conference site. For example, local videoconference system 1 includes monitor 50 and speaker 74 for communicating conference information received at network interface 90 to local users of videoconference system 1. Each videoconference system is coupled to a network interface in order to communicate conference information to other conference sites. For example, local videoconference system 1 includes cameras 10 and microphone 76 for communicating video and audio information from local videoconference system 1 to other, remote conference systems. Additionally, one or more of videoconference systems include one or more information display and/or processing devices such as computer system 60 for transmitting graphical information (e.g., computer graphics and/or user generated slides or slide annotations). In a multipoint environment, an MCU operates to receive information from and transfer information to the various conference sites. Each videoconference system at each conference site that will record a conference further includes a conference recording device such as a videotape recorder (e.g., VCR 20) or some other expedient (e.g., a digital recording device) for recording the focus of the conference and a record controller therefor.

Application memory 61 of computer system 60 may be any type of memory or combination of memory types and control circuits thereof. For example, application memory 61 may include active memory (e.g., random access memory) of computer system 60 and long term memory such as magnetic disk storage.

Those skilled in the art will recognize that boundaries between logic blocks are merely illustrative and that alternative embodiments may merge logic blocks or impose an alternate decomposition of functionality upon various logic blocks. For example, video switch 30, video processor 40, audio processor 70, mux/demux 80 and network interface 90 may be integrated with computer system 60.

Furthermore, those skilled in the art will recognize that boundaries between the functionality of the above described operations are merely illustrative. The functionality of multiple operations may be combined into a single operation, and/or the functionality of a single operations may be distributed in additional operations in accordance with the invention.

Moreover, alternative embodiments may include multiple instances of a particular component. For example, although an embodiment has been described including a various cameras and a single instance of slide application 64, other embodiments may include different numbers of cameras, multiple slide applications and multiple computer systems, for example.

The invention has been described with reference to controlling the input to a recording device at a videoconference site. However, the invention is not limited to the above description. For example, in another embodiment, video switch 30 is coupled to switch the input to an additional monitor that can be connected to the conference system. This enables a monitor to be placed in another room, for example, and a non-participating audience can view whatever is the focus of the videoconference. Thus, instead of, or in addition to, switching the input to a recording device, another input to a monitor may be switched.

The above description is not intended to present an exhaustive list of embodiments of the invention. Although an attempt has been made to outline some exemplary variations, other variations are within the scope of invention as defined in the claims below.

What is claimed is:

1. A videoconference system comprising:
   a video switch for selecting focus video information;
   a physical video input node coupled to provide physical video information to the video switch;
   a graphics processing module coupled to provide graphical video information to the video switch;
   a remote source interface coupled to provide remote video information to the video switch;
   an audio processing module for processing audio information; and
   a record controller coupled to the video switch, the graphics processing module and the audio processing module, the record controller coupled to receive event information from the audio processing module and the graphics processing module, the record controller automatically determining a focus video source from among the physical video input, the graphics processing module and the remote source interface responsive to receiving the event information, the record controller controlling the video switch to couple the focus video source to a video switch output responsive to determining the focus video source.

2. The videoconference system of claim 1 further comprising a recording device, the recording device comprising:
   a video input coupled to the video switch output to receive the focus video information, the recording device recording the focus video information responsive to receiving the focus video information; and
   an audio input coupled to the audio processing module to receive the audio information, the recording device recording the audio information responsive to receiving the audio information.

3. The videoconference system of claim 2 wherein the recording device is a videocassette recorder.

4. The videoconference system of claim 1 wherein
   the audio processing module includes a digital signal processor; and
   the graphics processing module includes a graphics processing software module for execution on a general purpose microprocessor.

5. The videoconference system of claim 1 further comprising:
   a camera coupled to physical video input node to provide physical video information captured by the camera to the video switch.

6. The videoconference system of claim 1 wherein the remote source interface comprises:
   a network interface card coupled to receive remote conference information from a remote conference site and coupled to provide local conference information to the remote conference site, the remote conference information including remote audio information and at least one of remote graphical information and remote physical information, the local conference information including local audio information and at least one of local graphical information and local physical information; and a multiplexer/demultiplexer coupled to the network interface card, the audio processing module and the graphics processing module, the multiplexer/demultiplexer providing remote audio information to the audio processing module and at least one of remote graphical information to the graphics processing module and remote physical information to the video switch responsive to receiving the remote conference information, the multiplexer/demultiplexer providing local conference information to the network interface card responsive to receiving local audio information from the audio processing module and at least one of local graphical information from the graphical processing module and local physical information from the video switch.

7. The videoconference system of claim 6 further comprising:

a monitor; and a video processing module coupled to the monitor, the video switch, the graphics processing module and the multiplexer/demultiplexer, the multiplexer/demultiplexer providing the remote physical information to the video switch via the video processing module, the multiplexer/demultiplexer receiving the local physical information from the video switch via the video processing module.

8. The videoconference system of claim 1 further comprising:

a talk/listen notification engine for identifying speakers of a videoconference; and wherein
the record controller comprises:
an audio engine coupled to receive talk/listen notifications from the talk/listen notification engine;
a record control engine coupled to receive the talk/listen notifications from the audio engine and coupled to the talk/listen notification engine for controlling the enablement of the talk/listen notification engine to provide the talk/listen notifications; and
a video routing engine coupled to the record control engine and the video switch, the video routing engine controlling the selection of the focus video source by the video switch under control of the record control engine.

9. The videoconference system of claim 1 further comprising a computer system, the computer system including
a user interface;
a graphics software module of the graphics processing module; and
the record controller.

10. The videoconference system of claim 9 wherein the audio processing module includes a talk/listen notification engine for identifying speakers of a videoconference; and
the record controller comprises:
an audio engine coupled to receive talk/listen notifications from the talk/listen notification engine;
a record control engine coupled to receive the talk/listen notifications from the audio engine and coupled to the talk/listen notification engine for controlling the enablement of the talk/listen notification engine to provide the talk/listen notifications; and
a video routing engine coupled to the record control engine and the video switch, the video routing engine controlling the selection of the focus video source by the video switch under control of the record control engine.

11. A method of selecting the focus of a videoconference, the method comprising:

receiving video information by a video switch from each one of a plurality of video sources, the plurality of video sources including a remote video source and a plurality of local video sources, the video switch providing video information from a current video source of the plurality of video sources to a video input node;

receiving event information by a record controller, the event information indicating that an event video source of the plurality of video sources is transmitting video information pertinent to the videoconference;

automatically determining by the record controller which of the remote and local video sources is the current video source;

automatically determining by the record controller which of the remote and local sources is a focus video source based on the event information, the record controller determining if the event source is a graphical source or a physical source;

setting a switch-delay time if the event source is a graphical source;

automatically determining by the record controller if the video switch requires switching to provide video information from the focus video source depending on whether the focus video source is the current video source; and automatically controlling the video switch to switch to provide video information from the focus video source to the video input if the video switch requires switching.

12. The method of claim 11 wherein the automatically determining if the video input requires switching to receive conference information from the focus source further depends on a number of monitors at a local site.

13. The method of claim 11 wherein the plurality of local sources includes a physical source and a graphical source.

14. The method of claim 11 wherein the remote source is a local interface coupled to receive conference information originating from each of a plurality of remote sources.

15. The method of claim 11 wherein the video input is coupled to an external-to-conference monitor for viewing by a nonparticipant to the conference.

16. The method of claim 11 wherein the video input is coupled to a recording device.

17. The method of claim 16 wherein the recording device is a videocassette recorder.

18. The method of claim 16 further comprising:

recording conference information by the recording device, the conference information being received from the video switch under control of the record controller.

19. The method of claim 18 further comprising:

determining if the switch-delay time has expired before determining if the video input requires switching; and wherein
the determining if the video input requires switching further depends on whether the switch-delay time has expired.

20. The method of claim 11 further comprising:

determining if the switch-delay time has expired before determining if the video input requires switching; and wherein the determining if the video input requires switching further depends on whether the switch-delay time has expired.

21. The method of claim 20 wherein the switch-delay time is set to a time dependent at least in part upon a user programmable time.

22. The method of claim 21 wherein the switch-delay time is set to a current clock time plus a user programmable minimum time.

23. The method of claim 11 wherein the event information is received by the record controller from at least one module for handling conference system events including camera position commands and annotations of slides.

24. The method of claim 23 wherein the at least one module for handling conference system commands and events comprises:

a graphics processing module; and an audio processing module.

25. The method of claim 11 further comprising:

receiving event information from a user interface, the event information received from the user interface indicating that one of the plurality of video sources has been manually selected as the focus video source by a user; and automatically determining by the record controller if the video switch requires switching to provide video information from the one of the plurality of video sources that has been manually selected as the focus video source depending on whether the focus video source is the current video source.

26. An apparatus for selecting the focus of a videoconference for a video input, the apparatus comprising:

a video switch for selecting focus video information;

a physical video input node coupled to provide physical video information to the video switch;

a graphics processing module coupled to provide graphical video information to the video switch;

a remote source interface coupled to provide remote video information to the video switch;

an audio processing module for processing audio information;

a computer-readable storage medium coupled to the video switch, the graphics processing module and the audio processing module; and a record controller stored on the computer-readable storage medium, the record controller coupled to receive event information from the audio processing module and the graphics processing module, the record controller automatically determining a focus video source from among the physical video input, the graphics processing module and the remote source interface responsive to receiving the event information, the record controller controlling the video switch to couple the focus video source to a video switch output responsive to determining the focus video source.

* * * * *